Aug. 5, 1958  E. A. ROBBINS  2,846,119
PRESETTABLE PREDETERMINER AND HYDRAULIC
CUT-OFF VALVE MECHANISM
Filed May 25, 1956  6 Sheets-Sheet 1

ELMER A. ROBBINS
*INVENTOR.*

BY Edmund W. E. Kamm
ATTORNEY

FIG. 2

ELMER A. ROBBINS
*INVENTOR.*

BY Edmund W.E. Kamm
ATTORNEY

Aug. 5, 1958

E. A. ROBBINS

2,846,119

PRESETTABLE PREDETERMINER AND HYDRAULIC
CUT-OFF VALVE MECHANISM

Filed May 25, 1956

ELMER A. ROBBINS
*INVENTOR.*

BY Edmund W. E. Kamm
ATTORNEY

Aug. 5, 1958

E. A. ROBBINS 2,846,119

PRESETTABLE PREDETERMINER AND HYDRAULIC
CUT-OFF VALVE MECHANISM

Filed May 25, 1956

ELMER A. ROBBINS
*INVENTOR.*

BY Edmund W. E. Kamm
ATTORNEY

United States Patent Office 2,846,119
Patented Aug. 5, 1958

2,846,119

PRESETTABLE PREDETERMINER AND HYDRAULIC CUT-OFF VALVE MECHANISM

Elmer A. Robbins, Fort Wayne, Ind., assignor to Tokheim Corporation, Fort Wayne, Ind., a corporation of Indiana Application May 25, 1956, Serial No. 587,371

19 Claims. (Cl. 222—20)

This invention relates to a predeterminer and hydraulic valve mechanism. More specifically it relates to a predeterminer and valve mechanism for use primarily on tank trucks such as are used to deliver fuel to the storage tanks which supply fuel to oil burners in homes and other buildings. In such cases relatively small deliveries on the order of fifty to three or four hundred gallons are made.

The operator making the delivery is usually stationed at the nozzle which is inserted in the tank and has a manually operated valve which the operator holds open. In case the tank does not hold as much fuel as expected, the operator will close the nozzle valve to prevent overflow. In case the full anticipated amount of fuel can be deposited in the tank, a mechanism is required to stop the flow of fuel when the desired amount has been delivered. Since the operator is not located at the meter so that he can read the register and manually stop the delivery, a predeterminer which may be preset to deliver the required amount of fuel and cut off the delivery is required.

It is an object of this invention to provide a presettable predeterminer for the service described.

Another object of the invention is to provide a predeterminer which is readily presettable.

A further object of the invention is to provide a predeterminer which will, near the end of the delivery slow the flow and, when the preset quantity has been delivered, terminate the flow of liquid.

Yet another object of the invention is to provide a stop mechanism which is positive and accurate in operation.

Still another object of the invention is to provide a valve which is mechanically triggered and hydraulically actuated toward closure.

It is a further object of the invention to provide a predeterminer which is manually operable to stop position to close the valve in the event the preset amount is not delivered.

Yet another object of the invention is to provide a predeterminer which is rugged and which is accurate in operation.

These and other objects will become apparent from a study of this specification and the drawings which are attached hereto, are made a part hereof and in which.

GENERAL PREDETERMINER ASSEMBLY

Figure 1:
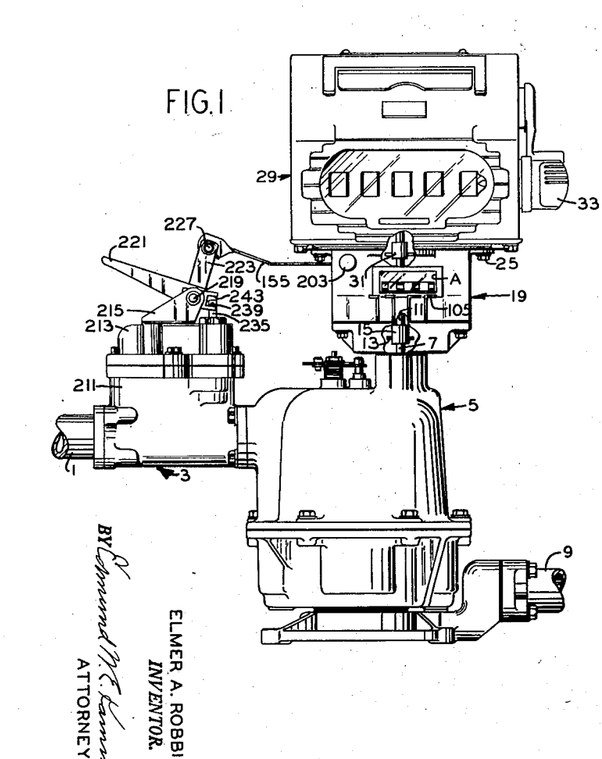
Figure 1 is a front elevation of the meter, valve, predeterminer and register assembly.

Figure 1

Referring first to Figure 1, the numeral 1 represents the supply pipe which supplies air free fuel from the tank truck to the valve indicated generally by numeral 3. The supply is under pressure, either gravity head or generated by a pump and is rendered air free by passage through any suitable air separator (not shown).

The valve 3 is connected to a meter 5 of any suitable type. For purposes of illustration, the meter may be of a positive displacement type such as that shown in the patent to Bechtold, No. 1,930,438, in which pistons controlled by a valve serve to drive a rotary shaft 7 in proportion to the liquid displaced by the pistons. In this case the shaft makes four revolutions for each gallon of displaced liquid. The measured liquid is discharged through a pipe 9 which is preferably connected through a back pressure valve and hose to a valved nozzle which are not shown because they represent conventional components of such systems.

The shaft 7 is coupled to the shaft 11 of the predeterminer 19 by the usual cross-pin 13 in shaft 7 and slotted coupling 15 on shaft 11.

The base 21 of the predeterminer is provided with perforated bosses 23 (Fig. 3) which are supported on suitable pads on the meter. The bosses have through holes for the screws 25 while the predeterminer housing 22 has aligned bosses 20 which rest on bosses 23 and are tapped to receive the screws 25 which thus hold the base clamped between the housing and the meter.

The top of the housing is also provided with suitable projections 27 which are adapted to support a register, printer or combination register and printer 29 of any suitable design which may be driven by a pin and slotted coupling connection 31 which is driven by the upper end of shaft 11. A printing register such as that shown in Patent Number 1,922,056, issued to McMullen, may be used. The printing register is reset to zero indication at the beginning of the delivery by actuating the knob of 33.

Figure 2:
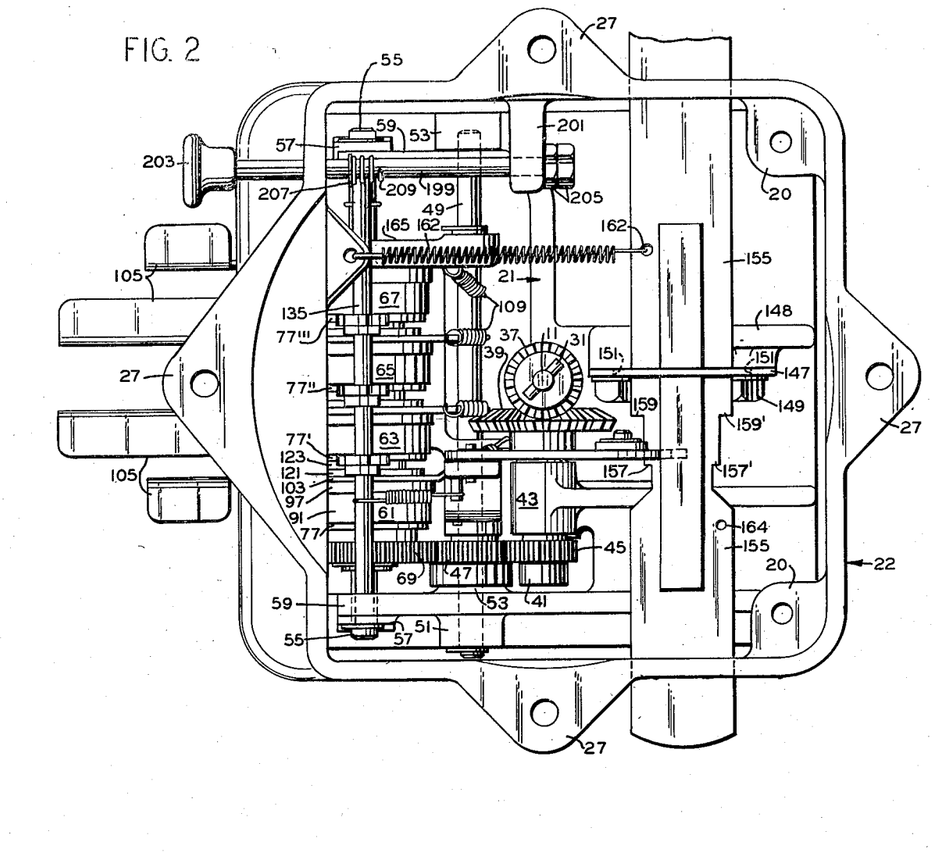
Figure 2 is a plan view of the predeterminer structure.
Figure 3:
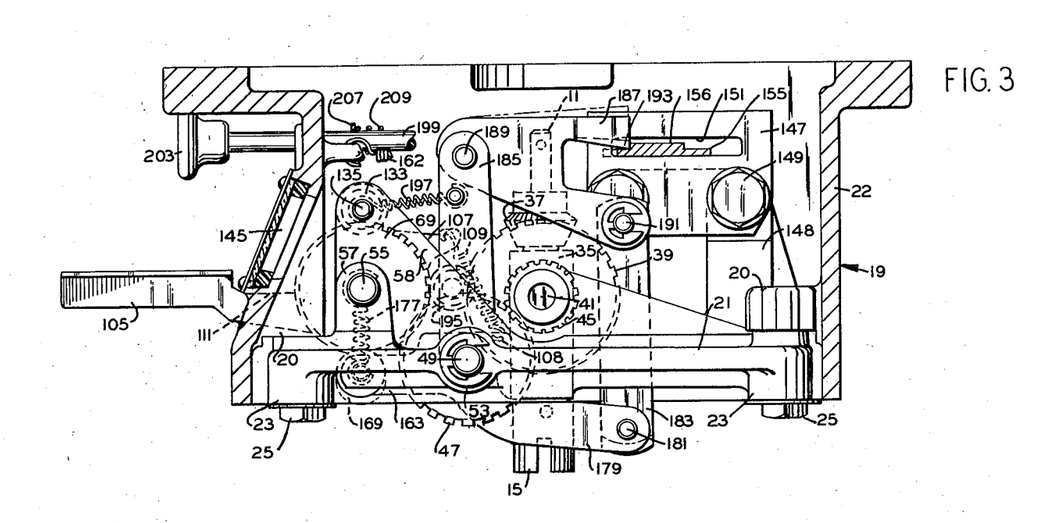
Figure 3 is an elevation of the structure of Figure 2 with parts of the housing broken away.
Figure 4:
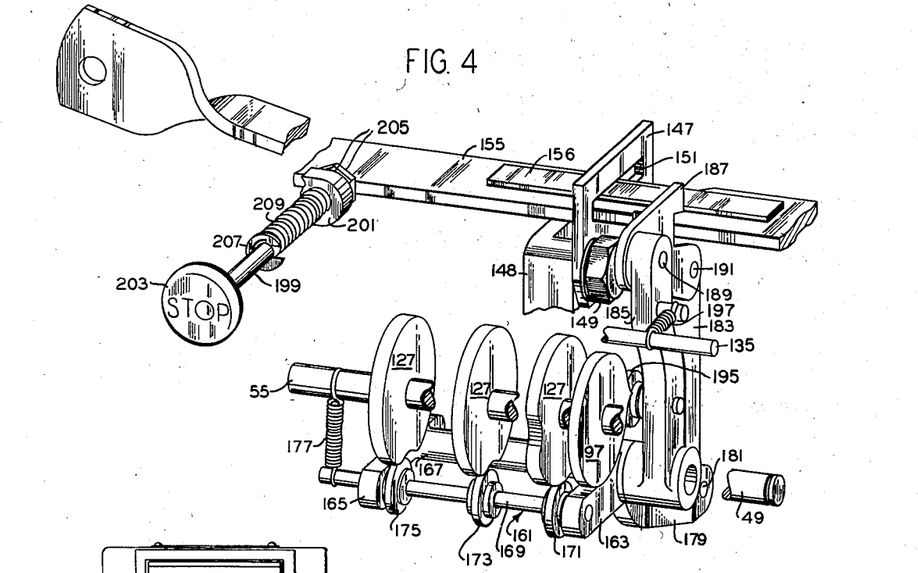
Figure 4 is an isometric view of the trip mechanism.

Referring now to Figures 2, 3 and 4, it will be seen that the base 21 is provided with a vertical boss 35 which rotatably supports the shaft 11 to which is fixed the bevel pinion 37. The pinion meshes with a bevel gear 39 rotatably mounted on a shaft 41 which is supported for rotation in the boss 43 also forming a part of the base.

The shaft 41 carries a spur pinion 45 which meshes with an idler pinion 47 which is rotatably mounted on a dead shaft 49 supported in suitable bosses 51, 53 formed on the base.

The shaft 55 which is mounted in bosses 57 formed on the base supports the preselector and cam assemblies 61, 63, 65 and 67 and the drive gear 69 of the assembly 61 is in mesh with the idler 47.

PRESETTING AND INDICATOR MECHANISM

Figures 1, 2, 3, 5, 6A, 6B

Figures 5, 6A, 6B, 6C:
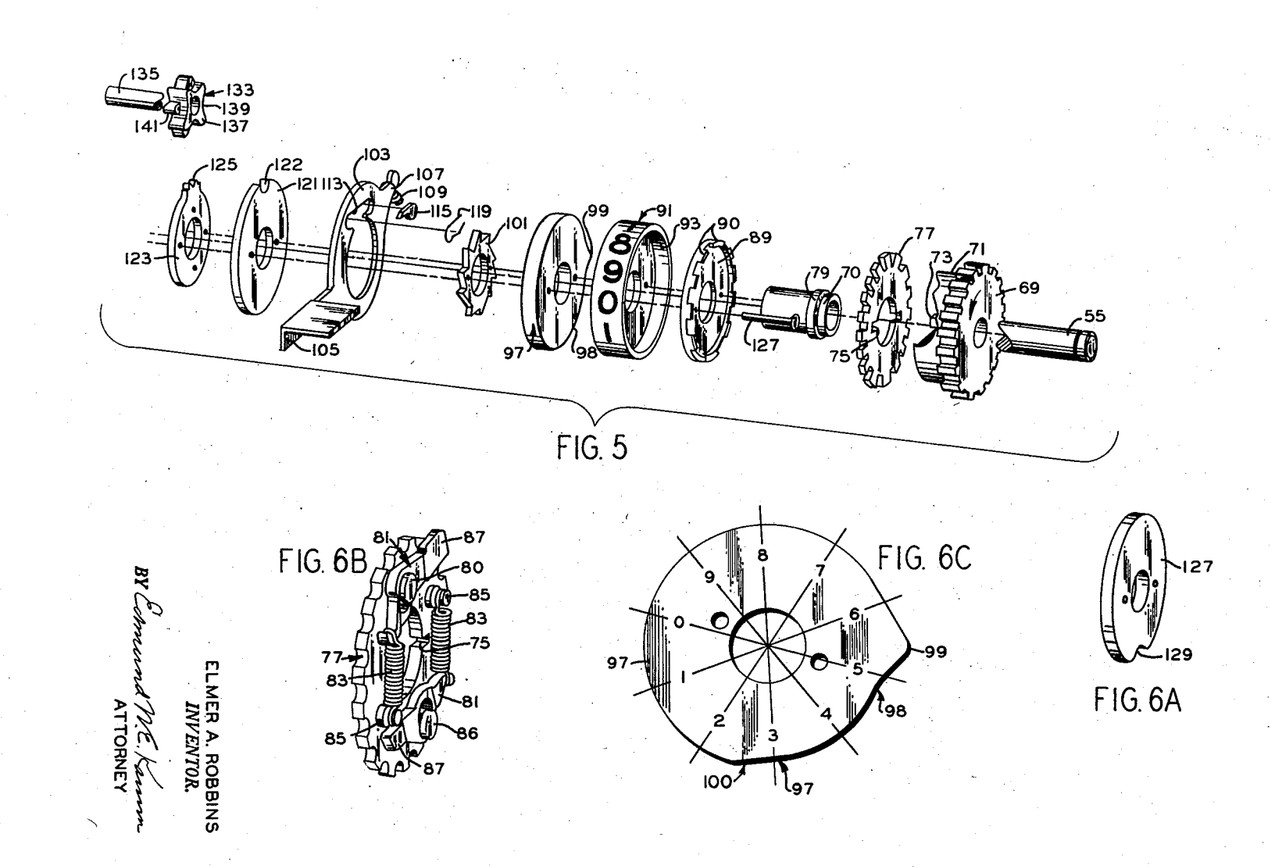
Figure 5 is an exploded view of the tenths section of the presetting and trip actuating mechanism.
Figure 6A is an isometric view of the trip control cam used in the higher order sections of the presetting and trip actuating mechanisms.
Figure 6B is an isometric view of the drive gear and pawl used in the higher order sections.
Figure 6C is a plan view of the trip cam.

Referring to Figure 5, which shows the tenths wheel assembly 61, the gear 69 is rotatably mounted on shaft 55 adjacent to one end of a flanged hub 70 which is rotatably mounted on shaft 55. The gear hub 71 is provided with projections 73 which enter notches 75 in gear 77 which is fixed to a hub 70 between the flange 79 and hub 71.

Mounted on pins 80 (Fig. 6B) on the other surface of gear 77 are two pawls 81, each of which has a spring 83 connected between the inner end of the pawl and a pin 85. The spring urges the free end 87 of the associated pawl beyond the periphery of the gear.

A ratchet 89 having axially projecting teeth 90 is rotatably mounted on the other end of hub 70 from gear 77. A numeral wheel or dial 91 is also rotatably mounted on the hub 70 beyond the ratchet and is provided with a recess 93 to snugly receive the ratchet. The free ends 87 of pawls 81 engage the teeth of the ratchet to prevent rotation of the ratchet dial assembly relative to gear 77 in clockwise direction Fig. 5 but to permit it in the opposite direction.

A trip cam 97 (Fig. 6C) is also rotatable on hub 70 and has a first raised actuating portion 98 and a projection 99. The first rise in the cam outline starts at 98 adjacent the bottom of the numeral 3 on the associated dial 91 and is completed at 100 near the bottom of the numeral 2. The second rise of projection 99 begins at about the middle of numeral 6 and reaches its peak at a point adjacent the bottom of numeral 5 after which the low level 96 of the cam outline is again reached.

A presetting member, which is a ratchet 101 having 10 teeth, is also rotatably mounted on the hub 70 and is encircled by the hub 103 of the presetting lever 105 which is rotatably supported thereon. An arm 107 extends from the hub 103 on the side opposite the lever 105 and is engaged by a spring 109 the other end of which is hooked in a hole 108 (Fig. 3). The other springs 109 are hooked on shaft 49. The lever 105 extends through a slot 111 in the predeterminer housing 22 which acts as a stop to limit the rotation of the lever induced by the spring. The hub 103 is provided with a recess 113 in which is mounted a pawl 115 adapted to enter ratchet 101 and a spring 119 which urges the pawl toward the ratchet. Downward rotation of the lever is limited by contact of the arm 107 with the base and the motion of the lever between the described limits is sufficient to advance the ratchet by slightly more than one tooth, however the pawls 87 and ratchet teeth 90 will properly position the dial as the lever returns to initial position.

Also rotatably mounted on hub 70 is a locking disc 121 having a notch 122 and a step tooth pinion 123 which has two adjacent teeth 125 formed thereon and located so as to span the notch 122.

The ratchet 89, dial 91, cam 97, ratchet 101, disc 121 and pinion 123 are all held together as a unit by rivets 127. The hub 103 is held against axial displacement by cam 97 and disc 121 and is guided by them.

It will be seen that as gear 69 and gear 77, which is fixed to hub 70, rotate counter-clockwise (Fig. 5) the pawls 87 will drive ratchet 89 and the other parts riveted to it in the same direction as the hub 70. The numerals on dial 91 are arranged so they they are displayed in decreasing order upon such rotation. The pawl 115 rides idly over ratchet 101 in this operation.

When the presetting lever 105 is actuated, pawl 115 drives ratchet 101 and the dial assembly in a counter-clockwise direction relative to the hub and the numerals on the dial appear in descending order. Meanwhile ratchet 89 passes idly over pawls 87. The latter and the gear 77 are held stationary by the drive gear train.

The units, tens and hundreds assemblies 63, 65 and 67 are basically the same as the structure just described except that the cam 127 (Fig. 6A) having a depression 129, is substituted for the cam 97. The gear 77' for the units order unit is fixed to the hub 70 of this unit. This unit is driven by the transfer pinion 133 which is rotatably mounted on a shaft 135 supported at its ends in the vertical projections 59 on the base, and is disposed above shaft 55. The pinion has a section provided with four long teeth 137 connected by locking ledges 139 which are engaged by the locking disc 121 which holds the pinion against rotation except when the notch 122, which is aligned with the space between teeth 125 of the pinion, is disposed in a position to receive a tooth 137 and said teeth 125 have picked up one of the teeth 137 to rotate the pinion 90 degrees.

The pinion 133 also has a section provided with four teeth 141 disposed intermediate the long teeth, which, with said long teeth, mesh with the 20 tooth drive gear 77', described above, on the units sections.

It will thus be seen that for each revolution of the tenths wheel 91 and step tooth pinion 123, the transfer pinion will be moved one quarter of a revolution or a space of two teeth 141, 147. The drive gear 77' of the units section will therefore be advanced $2/20$ or $1/10$ of a revolution to display the next lower numeral on its associated dial.

The transfer between the units and tens sections 63 and 65 and between the tens and hundreds sections 65 and 67 will be the same as described for that between the tenths and units section and is effected through the drive gears 77'' and 77'''.

The cams 127 are positioned so that the depressions 129 will be disposed at the bottom side in aligned condition when the zero numerals of the corresponding dials 91 are aligned adjacent the window 145 in the housing 22. They are thus positioned about even with the numeral 3 on the dial.

TRIP MECHANISM

*Figures 2, 3, 4*

As will be seen from Figures 2 and 4, latch plate 147 is mounted in an upright position on a post 148 which rises from the base 21 by screws 149 and contains a horizontal slot 151.

Figure 9:
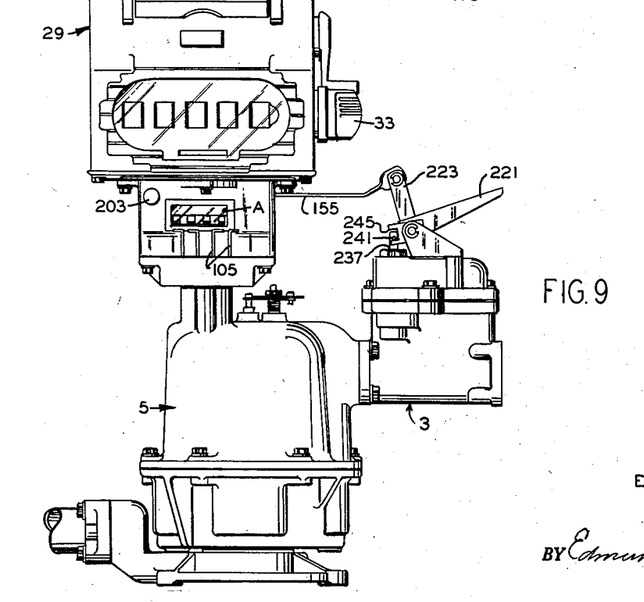
Figure 9 is a front elevation of the meter, predeterminer and valve mechanism arranged to control flow in a direction opposite to that of Figure 1.
Figure 10:
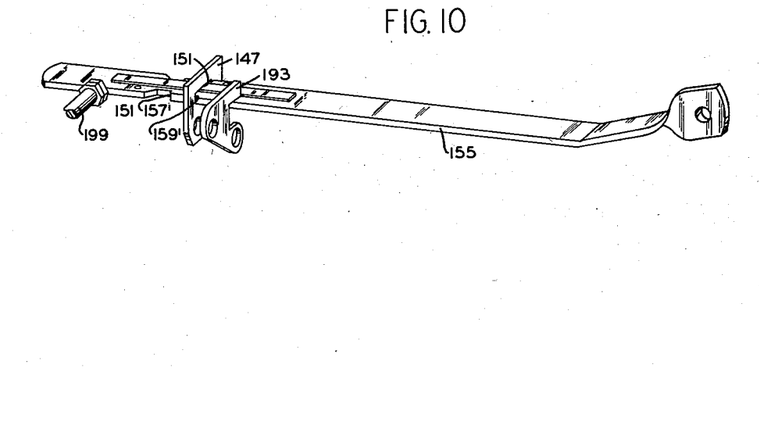
Figure 10 is an isometric view of the valve control bar and latching mechanism used in the arrangement of Figure 10.

A valve latch or control bar 155 is of substantially rectangular cross-section but has an actuator rib 156 which is preferably formed by extrusion as shown in Fig. 3. The bar is inserted through and guided by the slot 151 so that it can slide endwise in the slot and move parallel to the slot. The bar is provided with two projections 157 and 159 which are formed by notching the edge of the bar to different depths. Projection 157 cooperates with the latch plate to hold the bar in the full flow position while 159 holds it in the slow flow position. Similar projections 157' and 159' are provided on the other side of the bar which come into use when the control valve is mounted on the outlet side of the meter, as shown in Figures 9 and 10, in which case the bar is merely reversed. A spring 162 which has one end hooked into a hole 162' in the bar, urges the bar in a direction to position the projections adjacent proper end of the slot 151. Another hole 164 is provided at the other side of the bar to engage the spring when the bar is reversed. The bar is also urged toward the right, Figure 41, by the valve springs described below and to the left by the valve lever when it is manually depressed to open the valve.

The shaft 49, described above (Fig. 2), has pivotally mounted on it, a cam follower yoke or bail means 161 which comprises two arms 163, 165 connected by a bar 167 and a follower shaft 169. The follower rollers 171, 173, 175 which ride on the units, tens and hundreds cams 127, are carried on shaft 169. A spring 177 hooked between shafts 169 and 55 holds the rollers in contact with the cams.

Another arm 179 extends substantially in an opposite direction from arm 163 and has pivotally connected to it, at 181, an upwardly directed link 183.

An upright lever 185 is pivotally mounted on shaft 49 and extends substantially parallel to link 183. A push bar 187 is pivotally connected at 189 and 191 to the upper ends of 185 and 183 respectively. The push bar has a projection 193 which occupies the dashed line position of Figure 3 when the rollers 171, 173 and 175 or any one of them rides on the high portion of the associated cam 127 and in this position, it will pass over the rib 155 on the latching bar. However, when the rollers all occupy the notches in their associated cams, the levers 163, 165 rise and depress lever 179, link 183 and the push bar to its full line position (Fig. 3) which aligns the projection 193 with the rib 156 of bar 155.

The lever 185 carries a roller or cam follower 195 which rides on the tenths cam 97. A spring 197 is connected between the transfer shaft 135 and lever 185 and holds the follower on the cam so that each time the rise 98 or the projection 99 engages the follower 195, the lever 185 will be pivoted so as to move the push bar toward the latch bar. This occurs without effect so long as the push bar occupies its dashed line position but when it occurs with the push bar in its full line position, the valve bar will be moved away from contact with the end of slot 151 by the rise 98 far enough to disengage projection 157 from the latch plate whereupon the latch bar will be moved to the right by the valve springs (described below) and will bring projection 159 into engagement with the latch plate. Subsequently, the latch bar is moved away from the end of slot 151 by the action of the cam projection 99 a distance sufficient to disengage projection 159 from the latch plate and the valve springs will move the latch bar to the valve closed position.

The rollers 171, 173 and 175 and notches 129 of cams 127 are so related that when the zero numerals on their associated dials read zero in the window A of the predeterminer, the rollers will occupy the notches. The teeth 125 of transfer pinions 123 and notches 122 of discs 121 of all of the sections are so arranged with respect to the dials 91 that the transfer occurs when the next inferior order dial passes from numeral 9 to numeral 0 in the window.

Further the rise 98 in cam 97 is so positioned with respect to its dial and the cam follower 195 that it actuates the follower during the interval required to move numeral 8 out of the window and position numeral 7 therein. The projection 99 is so arranged that it actuates the cam follower 195 to its fullest extent just as the numeral zero appears fully in the window. The transfer from the tenths section 61 to units section 63 occurs almost immediately as the zero starts to move out of its fully displayed position. Thus when the reading on the presettable register has been reduced to 001.0 gallon, upon slight additional movement of the tenths section the register will read 000.9 gallon. When an additional two tenths of a gallon have been dispensed and the register reads 000.7 the push bar will have disengaged projection 157 from the latch plate and the projection 159 will have engaged the latch plate. The rate of delivery will have been reduced as will be explained below. This reduced rate of flow continues until the zero on the tenths dial moves fully into the window, whereupon the projection 99 will have disengaged the projection 159 from the latch plate and the valve will have stopped delivery entirely. Since the operation of the mechanism has been stopped, no transfer will occur or that the register will read 000.0 gallons. The printer or register 29 will read the amount which was originally preset on the predeterminer register.

EMERGENCY RELEASE

*Figures 1, 2, 3 and 4*

Referring to Figures 2 and 3, a pushrod 199 is slidably received in the housing 22 and a boss 201 formed thereon and carries, on the outer end therof, a knob 203 and on the inner end, a pair of jam nuts 205. A collar 207 is mounted on the rod and a spring 209 is confined between the collar and boss 201 so as to urge the rod outwardly of the housing 22. The rod is aligned with the latch bar 155 so that on movement of the rod into the housing, the valve latching bar will be moved to unlatch the projections 157 and or 159 from the latch plate to permit the main valve to close quickly and completely.

Thus, if the fuel tank nears the overflow point the operator will close the nozzle valve to prevent the overflow and upon his return to the truck he may actuate the release button to permit the control valves to close.

VALVE MECHANISM

Figure 7:
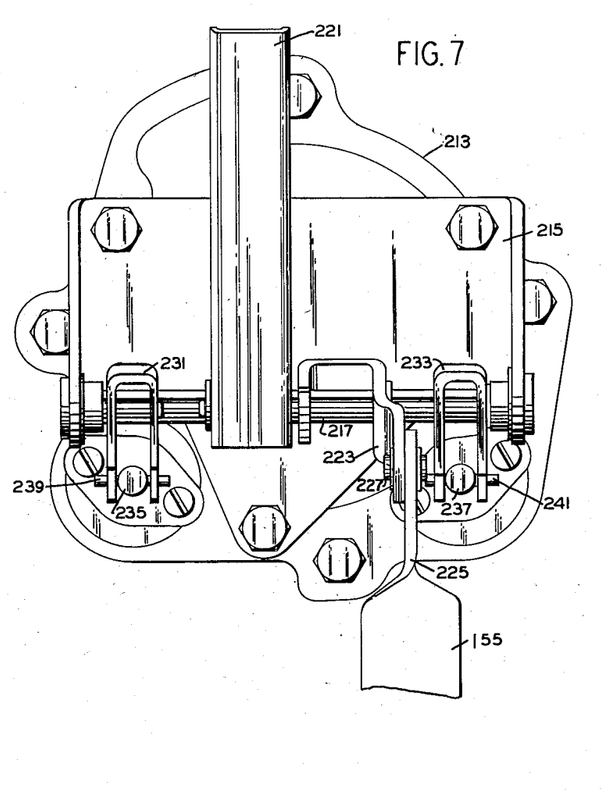
Figure 7 is a plan view of the valve assembly.
Figure 8:
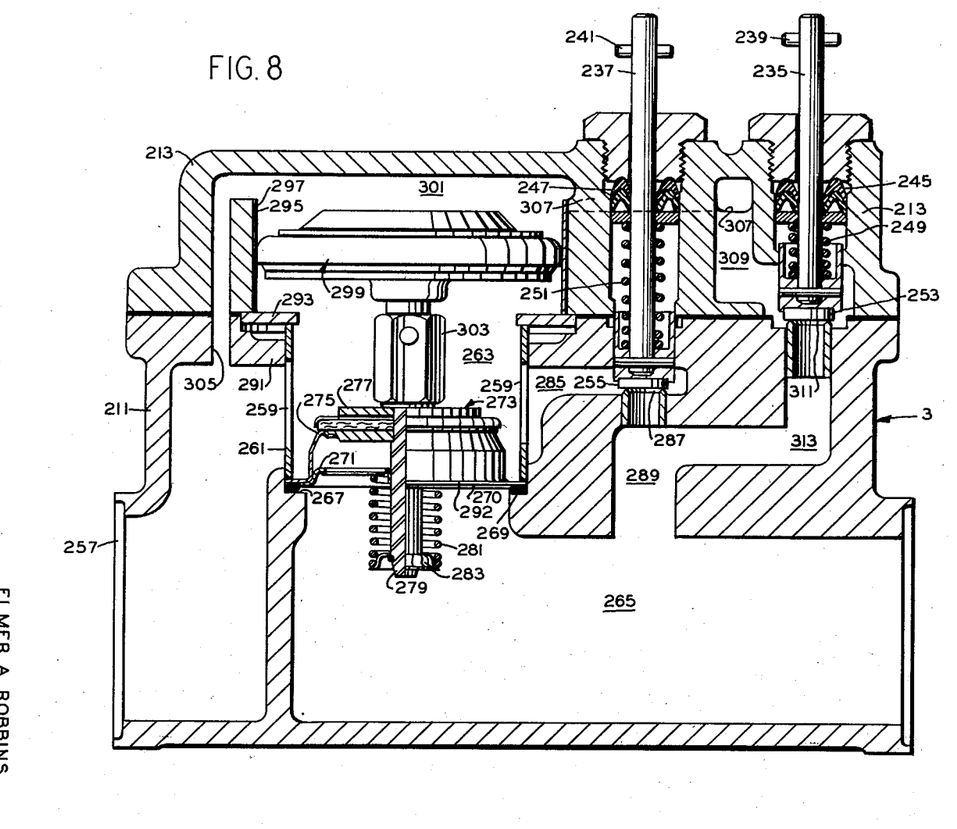
Figure 8 is a schematic view of the valve assembly showing the liquid passages and valves.

*Figures 1, 7, 8*

Referring now to Figures 1, 7 and 8, the numeral 211 represents the valve body which is provided with a cap 213 on top of which is mounted a valve lever bracket 215. A square, valve actuator shaft 217 has cylindrical journals 219 mounted in the bracket.

The valve handle 221 has square holes which receive the shaft 217. A latch bar actuating lever 223 has square holes which receive the shaft 217. The end of the latch bar which extends out of the housing is twisted 90 degrees at 225 and is pivotally connected to the upper end of lever 223 at 227.

Two U-shaped control valve actuator levers 231, 233 have square holes and are mounted thereby on the shaft 217. The ends of the levers span the stems 235, 237 of the primary and secondary valves, respectively. Cross pins 239, 241 in the respective stems enter notches 243, 245 in the ends of the levers.

It will be seen from Figures 1 and 8 that the pin 241 is set in the control valve stem at a lower level than that which the pin 239 occupies in its stem. Since the notches 243, 245 are aligned transversely, the counterclockwise rotation of the shaft 217 will first lift the stem 237 and thereafter stem 235. On clockwise rotation, stem 235 will be fully lowered on the first rotation of shaft 217 while stem 237 will be fully lowered on the second rotation.

Referring to the schematic view, Figure 8, it will be seen that both stems enter the valve cap 213 through suitable packing boxes 245, 247, are urged downwardly by springs 249, 251 and carry pilot and secondary valves 253, 255 respectively.

The valve body 211 has an inlet port 257 which is connected to the pipe 1 and which communicates through ports 259 in a sleeve 261 with an inlet chamber 263. This chamber communicates with discharge chamber 265 through a flange 267 on which is seated an O-ring seal 269 and upon which rests the flange 270 of a guide spider 271 of a unitary valve assembly 273. A valve seat 275 rests on the spider and a valve 277 has a stem 279 which is supported in the guide. A spring 281 is compressed between the guide and a seat 283 on the stem to urge the valve towards its seat.

The inlet chamber 263 also communicates through a channel 285, valve seat 287 and channel 289 with the discharge chamber 265. The seat 287 cooperates with the secondary control valve 255. One end of the sleeve 261 passes through a flange 291 in the body and the other end rests on the flange 292 of the valve seat. A flat ring 293 is disposed in overlying contact with the upper end of the sleeve in a position to be contacted and depressed by the cap 213 as it is drawn down on the body so that O-ring 269 will be compressed in sealing relation between flange 267 and the flanges 292 and 270 on the valve seat and the guide spider.

The cap is provided with a cylinder 295 which is pressed into a bore 297 in the cap and is substantially concentric with the sleeve 261. A piston 299, of any suitable construction, rides in the cylinder to form, in the cap, a control chamber 301. The main valve 277 is connected by a suitable coupling 303 to the piston. The valve and piston are hereinafter designated a "servo-valve."

Chamber 301 communicates with the inlet 257 through a relatively restricted channel 305 and with the outlet chamber 265 through relatively unrestricted channels 307, 309, seat 311 which cooperates with valve 253, channels 313 and 289.

As noted above the valve 255 is first opened when the valve lever 221 is depressed and permits flow of liquid from the inlet 257 through ports 259, chamber 263, channel 285, valve seat 287 and channel 289 to the discharge chamber 265. Further depression of the lever opens valve 253 and since liquid can flow at a greater rate from chamber 301 through channels 307, 309, seat 311, channels 313 and 289 than liquid can be supplied to the chamber 301 through the restricted channel 305, the pressure on the lower side of piston 299, being substantially inlet pressure, will overcome spring 281 and the pressure in chamber 301, which is substantially less than inlet pressure, so that the main valve 277 will be fully opened by the piston. Full flow of liquid is thus attained.

The valve control or latch bar 155 is moved endwise to the left (Fig. 1) by levers 221 and 223 and to the right under the action of the valve springs 249, 251. When the latch bar moves to the position in which projection 159 contacts the latch plate 147, as described above, the valve 253 will be closed by its spring 241 to close off the channels 307, 309 and prevent the escape of liquid from chamber 301. The pressure in chamber 301 becomes equalized with that in chamber 263 through channel 305 and this pressure together with spring 281 will close valve 277.

Valve 255 remains open however, and consequently, flow at a reduced rate will continue from chamber 263 to 265.

When the latch bar 155 is again actuated to disengage projection 159 from latch plate 147, the valve spring 251 will close valve 255 to terminate all flow from chamber 263 to 265 and the dispensing cycle is terminated.

OPERATION

Referring primarily to Figure 1, assuming that the apparatus is in the normal non-delivery condition, and that the supply pump is running, the operator will first actuate the various levers 105 to set the associated register wheels 91 to the gallonage which he desires to dispense. This is preferably done from right to left, that is, the tenths, units, tens and hundreds wheels are set in that order so the setting is not disturbed in the event that the wheel being adjusted passes through the transfer position which would cause actuation of the next higher order wheel.

He will then reset the register 29 to zero and/or condition the printer for operation. Next he depresses the valve lever 221 to its full extent so that the projection 157 of the valve control bar will engage latch plate 147. The nozzle valve on the hose remains closed so that there is no flow through the valve 211. Valves 253 and 255 are open however but since the hose is full of liquid, no liquid will flow through the meter.

When the nozzle has been carried to and inserted in the tank which is to be filled, the nozzle valve is opened and flow starts at once. The drop in pressure in chamber 265, due to opening of the nozzle valve, is communicated to chamber 301 through valve 253 and the associated channels so that the piston 299 will open the main valve 277.

Flow at the maximum rate then starts and the register wheels 91 rotate to decrease the amount which was preset on them. When the hundreds, tens and units cams are eventually aligned, the bail 161 rotates clockwise, Figure 3, and pulls link 183 and push bar 187 downwardly to their solid line positions. The projection 193 of the push bar is thus positioned to engage the rib 156 on the valve control bar 155 when the push bar is actuated by cam 97. When the trip mechanism is operated for the first time by the raised portion 98 on the tenth cam 97, the latch bar moves laterally far enough to disengage projection 157 from latch plate 147 and the bar is then moved by the valve springs 249—251 to its intermediate position with projection 159 in engagement with latch plate 147. The pilot valve 253 is closed and this closes the main valve 277 as described above, to reduce the rate of flow. Flow continues at a reduced rate through valve 255 until the tenths wheel completes its last revolution and as this occurs, the latch bar is again actuated laterally by the projection 99 and push bar 187, a distance sufficient to disengage projection 159 from stop plate 147 so that the valve springs may return the valve control bar to its initial or stop position closing valve 255 to stop the flow.

The operator then closes the nozzle valve, reels up the hose and takes the ticket or notes the reading of the register. This completes the cycle.

Should the tank reach overflowing condition before the preset amount has been delivered, the operator will stop the flow by closing the nozzle and will actuate the emergency button 203 upon his return to the truck. This will release the latch bar from the latch plate and both valves 253, 255 will close and the former will cause the main valve to close as described.

MODIFIED FORM

*Figures 9 and 10*

It is often necessary to accommodate a flow of liquid from right to left rather than left to right as shown in Figure 1, with the predeterminer dials and register facing in the direction shown in Figure 1. In such case, the meter 5 and valve 3 must be rotated, as a unit, 180 degrees relative to the predetermining mechanism and register as shown in Figure 9.

To effect this change it is necessary to also reverse the valve control bar or member 155 as shown in Figure 10 so that it is moved to the right by depression of valve lever 221 and the projection 157' engages the stop or latch plate 147 to hold the contact bar in its "run" position.

When the rise 98 on the trip cam 97 forces the push bar 187 into contact with the control bar displacing it a distance sufficient to disengage projection 157' and stop plate 147, the bar 155 will be moved to the left (Figure 1) to its intermediate or "slow" position which is determined by engagement of projection 159' with latch plate 147, by the valve springs 249, 251 acting as described above.

Similarly when the projection 99 on the trip cam next moves the bar 155 laterally a distance sufficient to disengage projection 159' from the stop plate 147, the valve springs will move the bar 155 to its stop position.

The free end of the bar 155 is long enough to project into the path of the emergency stop plunger 199 which, when fully actuated, will displace the bar 155 laterally far enough to move both projections 157' and 159' out of engaging position with latch plate 147 so that the valve control member may be returned from either the "run" or "slow" positions directly to its stop position and the valve or valves which may have been open will be closed.

The operation of the valves and predeterminer mechanism in this arrangement of the device is exactly the same as described above.

While several embodiments of the invention have been disclosed herein for purposes of illustration, it is obvious that various changes can be made in form, construction and arrangements of parts without departing from the spirit of the invention. I do not desire, therefore, to be limited to the specific forms of the invention disclosed but desire protection falling fairly within the scope of the appended claims.

What I consider to be new and desire to protect by Letters Patent of the United States is:

1. In a batching, liquid dispensing apparatus, the combination of a liquid meter, a presettable predeterminer connected for operation by said meter and including a control member mounted for movement between full flow, partial flow and flow stopping positions, engagable means for holding said member in full flow and partial flow positions and means for rendering said engagable means ineffective, after a predetermined delivery, to free said member for movement to the succeeding position, a valve body having an inlet chamber, an outlet chamber and separate large and small flow channels communicating with said meter through said inlet chamber, a normally closed main valve for said large channel, yieldable means for urging said main valve closed, a fluid motor connected to the main valve to open it when the motor is energized, a restricted channel connecting said motor with said inlet chamber, a normally closed secondary valve for the small channel, means including a normally closed pilot valve for and a channel connecting said motor directly with said outlet chamber to energize the fluid motor when the pilot valve is opened, manual actuating means, means connecting said actuating means to open said pilot and secondary valves and to move said control member to full flow position for engagement of said holding means, means for urging said pilot and secondary valves and control member respectively toward closed and flow stopping positions, said control member and connecting means serving to hold only said secondary valve open when said control member occupies its partial flow position and freeing said secondary valve for closure when the control member moves its flow stopping position.

2. The structure defined by claim 1 wherein said valve body comprises means defining inlet and discharge chambers, said fluid motor having a cylinder, a piston mounted therein and connected to said main valve, said channels both communicating with the same end of said cylinder and means for establishing unrestricted communication between the other end of said cylinder and the inlet chamber, said pilot valve being disposed to control said outlet channel.

3. In a batching, liquid dispensing apparatus, the combination of a liquid meter, a predeterminer connected for operation by the meter and including a control member mounted for movement between flow and flow stopping position, means for holding said member in full flow position, means for rendering said holding means ineffective, after a predetermined delivery, to free said member for movement to flow stopping position, a valve body having means defining an inlet chamber and an outlet chamber, said chambers being connected by a valve port, a normally closed main valve movable to close and open said port, yieldable means for urging said valve closed, a fluid motor connected to said valve and adapted, when energized, to move said main valve to open the port, means including a substantially unrestricted channel for connecting said fluid motor directly to said outlet chamber, a pilot valve in said channel, and a restricted channel connecting said motor with said inlet chamber, said means serving to energize said motor when the pilot valve is opened, manual actuating means, means connecting said actuating means to open said pilot valve and to move said control member to flow position for engagement of said holding means, means for urging said pilot valve closed and said member to flow stopping position when said holding means are rendered ineffective.

4. The structure defined by claim 3 wherein said fluid motor includes a cylinder disposed in substantial alignment with said port, a piston connected to said main valve, said channels both communicating with one end of said cylinder, the other end of said cylinder communicating unrestrictedly with said inlet chamber, whereby the fluid pressures on the piston are balanced when said pilot valve is closed to maintain said main valve closed, and whereby the fluid pressures on the piston become unbalanced in a direction to open the main valve when said pilot valve is opened.

5. In a presettable predetermined stop mechanism, a control section comprising a shaft, a gear mounted on the shaft, a trip and indicator assembly mounted on the shaft and comprising a dial ratchet, an indicator dial having indicia equidistantly spaced about its periphery, a cam, a presetting member, a locking disc and a transfer pinion fixed together for rotation as a unit, means including a pawl mechanism connecting said gear to drive said dial ratchet in one direction and to prevent rotation of the dial ratchet in the opposite direction, a presetting lever having a hub mounted for rotation on said presetting member, and means connecting said member for movement by said lever only when the lever is rotated in said one direction.

6. In a presettable predetermined stop mechanism, a control section comprising a shaft, a gear mounted on the shaft, a trip and indicator assembly mounted on the shaft and comprising a dial ratchet, an indicator dial having indicia equidistantly spaced about its periphery, a cam, a presetting member, a locking disc and a transfer pinion fixed together for rotation as a unit, means including a pawl mechanism connecting said gear to drive said dial ratchet in one direction and to prevent rotation of the dial ratchet in the opposite direction, a presetting lever having a hub mounted for rotation on said presetting member, ratchet means connecting said member for movement by said lever only when the lever is rotated in said one direction and yieldable means connected with said presetting lever for moving it in said opposite direction.

7. In a presettable predetermined stop mechanism, a control section comprising a shaft, a gear mounted on the shaft, a trip and indicator assembly mounted on the shaft and comprising a dial ratchet, an indicator dial having indicia equidistantly spaced about its periphery, a cam, a presetting member, a locking disc and a transfer pinion fixed together for rotation as a unit, means including a pawl mechanism connecting said gear to drive said dial ratchet in one direction and to prevent rotation of the dial ratchet in the opposite direction, a presetting lever having a hub mounted for rotation on said presetting member, means connecting said member for movement by said lever only when the lever is rotated in said one direction and means for limiting the stroke of said lever in said one direction to position succeeding indicia of said dial at a predetermined position.

8. In a presettable predetermined stop mechanism, a control section comprising a shaft, a gear mounted on the shaft, a trip and indicator assembly mounted on said shaft and comprising in order, a dial ratchet, an indicator dial having indicia equidistantly spaced about its periphery, a cam, a presetting member, a locking disc and a transfer pinion fixed together for rotation as a unit, means including a pawl mechanism connecting said gear to drive said dial ratchet in one direction and to prevent rotation of the dial ratchet in the opposite direction, a presetting lever having a hub mounted for rotation on said presetting member, means connecting said member for movement by said lever only when the lever is rotated in said one direction, said cam and locking disc being of greater diameter than said presetting member and serving to guidingly confine the hub of said presetting lever.

9. The structure defined by claim 5 wherein said presetting member is a toothed ratchet and the hub of the presetting member is cut away to receive a pawl and a spring for urging the pawl into engagement with the ratchet.

10. In a presettable predetermined stop mechanism, a shaft, a plurality of trip control sections of various orders rotatably mounted in axial alignment on the shaft, each section including a trip cam having a stop position, bail means disposed adjacent the trip cams of the higher order sections and actuable to trip position when all of said cams are in stop position, a control bar mounted for axial and lateral motion, control bar latching means including a stop and a projection on the bar for engaging said stop, means for yieldably urging said bar in direction to engage the projection and stop, a trip mechanism mounted for movement by the trip cam of said lowest order section to render said latching means ineffective, said trip mechanism having effective and ineffective conditions, and being moved to effective condition by said bail means when the latter occupies its trip position.

11. In a presettable predetermined stop mechanism comprising a control section of low order which includes a rotatable trip cam, a number of control sections of higher order each including a rotatable control cam each having a stop position, a trip mechanism including releasing means mounted for movement between effective and ineffective positions and for actuating to and from a releasing position, when it occupies its effective position, said mechanism including follower means for said control cams and cooperating therewith to move said releasing means to effective position only when all of said control cams occupy their stop positions, means including said trip cam for actuating said releasing means to and from another position at least once during each revolution of the trip cam, a control member mounted for movement between run and stop positions, releasable means for latching the member in run position, said releasing means serving to release said latching means only when it is actuated by said trip cam while said releasing means occupies its effective position.

12. A presettable predetermined stop mechanism comprising a control section of low order which includes a rotatable trip cam, a number of control sections of higher order each including a control cam having a stop position, stop means, a control bar having latch means and mounted for longitudinal movement between run and stop positions and laterally for latching and unlatching said latch means and said stop means, a trip mechanism including an actuating element mounted for reciprocating movement laterally across said bar and for movement to and from a level at which it may contact said bar, means, including followers for said control cams, for moving said actuating element to a level for contact with the bar when said control cams occupy their stop positions and means including said trip cam for reciprocating said actuating element at least once during every revolution of the trip cam, said element upon reciprocation at said level, serving to engage and displace said bar laterally to unlatch said latch and stop means.

13. The structure defined in claim 12 wherein presetting means, including a lever for each control section, is provided to selectively position the corresponding cam of that section out of stop position, wherein said lowest order section is rotated in proportion to the movement of a liquid meter and wherein transfer means are provided between each section and the next higher order section.

14. The structure defined by claim 12 wherein each control section comprises a hub, a trip and indicator assembly comprising a dial ratchet, an indicator dial having indicia equidistantly spaced about its periphery, a cam, a presetting member, a locking disc and a transfer pinion fixed together for rotation as a unit on said hub, a drive gear, a pawl mechanism connecting said gear to drive said dial ratchet in one direction and to prevent rotation of the dial ratchet in the opposite direction, a presetting lever having a hub mounted for rotation on said presetting member, and means connecting said member for movement by said lever only when the lever is rotated in said one direction.

15. A presettable predetermined stop mechanism comprising a control section of low order which includes a rotatable trip cam having first and second steps, a number of control sections of higher order each including a rotatable control cam having a stop position, a trip mechanism including releasing means mounted for movement between effective and ineffective positions and for actuation to first and second releasing positions when it is in its effective position, a control member mounted for movement between run and stop positions through an intermediate position, first releasable latching means for holding the member in run position, second releasable latching means for holding the member in intermediate position, means including follower means for moving said releasing means to its effective position when said control cams occupy their stop positions, means including said first step of said trip cam for actuating said releasing means to said first, releasing position to release said first latching means, means including the second step of said trip cam for actuating said releasing means to said second releasing position to release second latching means, and means for moving said control member to said intermediate position upon the release of said first latching means and to stop position upon release of said second latching means.

16. The structure defined in claim 15 wherein said releasing means is operated toward and away from said control member upon each revolution of the trip cam and wherein said trip mechanism in ineffective to actuate either latching means when it occupies its ineffective position.

17. A presettable predetermined stop mechanism comprising a control section of low order which includes a rotatable trip cam having first and second steps, a number of control sections of higher order each including a rotatable control cam having a stop position, a control bar mounted for longitudinal movement between start and stop positions through an intermediate position and laterally, a stop, a first projection on said bar adapted to engage said stop, upon lateral movement of the bar, to hold the bar in its run position, a second projection on said bar adapted to engage said stop, upon lateral movement of the bar, to hold the bar in its intermediate position, a trip mechanism including an actuating element mounted for reciprocation transversely of said bar from a retracted position successively to a first and a second position unlatching position and for movement to and from a level at which it may contact said bar, means, including a follower mechanism for said control cams, for moving said actuating element to said level when said control cams occupy their stop positions and means including said first step of said trip cam for actuating said element to its first unlatching position to disengage said first projection from the stop, means including the second step of said trip cam for actuating said element to its second unlatching position to disengage the second projection from said stop and means for urging said control bar toward stop position.

18. The structure defined in claim 17 wherein each control section comprises a hub, a trip and indicator assembly comprising in order, a dial ratchet, an indicator dial having indicia equidistantly spaced about its periphery, a cam, a presetting member, a locking disc and a transfer pinion fixed together for rotation as a unit on said hub, a drive gear, a pawl mechanism connecting said gear to drive said dial ratchet in one direction and to prevent rotation of the dial ratchet in the opposite direction, a presetting lever having a hub mounted for rotation on said presetting member, and means connecting said member for movement by said lever only when the lever is rotated in said one direction.

19. A presettable predetermined stop mechanism comprising a control section of low order which includes a rotatable trip cam, having first and second steps, a number of control sections of higher order each including a rotatable control cam having a stop position, a bail having cam followers in contact with the control cams and means for tilting said bail when all of said cams occupy their stop positions, an arm extending from said bail having an upwardly directed link which is pivotally attached to one end of a push bar, a lever pivotally mounted substantially coaxially with said bail, extending substantially parallel with said link and pivotally connected with the other end of said push bar, said push bar having an outwardly extending element, a control member mounted below said element, for longitudinal movement between stop and run positions through an intermediate position and for transverse movement in directions substantially parallel to the movement of said push bar, a stop, first and second projections on said bar movable in one of said directions for engagement with said stop when the control member occupies its run and intermediate positions respectively, means for urging said member toward stop position, said bail, arm and link serving to move said push bar element into a plane in which it will rest upon said control member, when said control cams occupy their stop positions and means on said lever, cooperating with the first step of said trip cam for moving said element to unlatch said first projection from said stop and cooperating with the second step of said trip cam for moving said element to unlatch said second projection from said stop whereby said control member will be moved from its run to its intermediate position in one step and will thereafter be moved from its intermediate to its stop position.

References Cited in the file of this patent

UNITED STATES PATENTS

| | | |
|---|---|---|
| 2,057,333 | Guibret | Oct. 13, 1936 |
| 2,114,207 | Berch | Apr. 12, 1938 |
| 2,527,703 | Carbanaro | Oct. 31, 1950 |
| 2,655,285 | Granberg | Oct. 13, 1953 |
| 2,675,943 | Daley et al. | Apr. 20, 1954 |